United States Patent
Uggerud et al.

(10) Patent No.: US 6,529,839 B1
(45) Date of Patent: Mar. 4, 2003

(54) ENERGY COORDINATION SYSTEM

(75) Inventors: Ward Uggerud, Fergus Falls, MN (US); Donald Davenport, Battle Lake, MN (US); Bradley Tollerson, Fergus Falls, MN (US); Dale Hanson, Fergus Falls, MN (US); Myron Rader, Fergus Falls, MN (US); Katherine Sasseville, Fergus Falls, MN (US); Lawrence Larson, Fergus Falls, MN (US); Kirby Kugler, Erhard, MN (US); Wallace Ness, Fergus Falls, MN (US); Tom Brause, Fergus Falls, MN (US)

(73) Assignee: Retx.com, Inc., Atlanta, GA (US)

( * ) Notice: Subject to any disclaimer, the term of this patent is extended or adjusted under 35 U.S.C. 154(b) by 0 days.

(21) Appl. No.: 09/086,122

(22) Filed: May 28, 1998

(51) Int. Cl.$^7$ ................................................. H04Q 9/00
(52) U.S. Cl. ............................. 702/61; 702/57; 702/60; 702/62; 702/106; 702/188
(58) Field of Search ................................ 702/57, 61, 62, 702/106, 60, 188; 324/140, 113; 340/870.024; 705/412; 307/30, 32, 35, 38; 700/291, 295, 296

(56) References Cited

U.S. PATENT DOCUMENTS

| | | | |
|---|---|---|---|
| 3,998,267 A | * 12/1976 | Faiczak | 165/48 |
| 4,236,217 A | * 11/1980 | Kennedy | 364/483 |
| 4,847,781 A | 7/1989 | Brown, III et al. | |
| 5,462,225 A | * 10/1995 | Massara et al. | 236/47 |
| 5,479,358 A | 12/1995 | Shimoda et al. | |
| 5,566,084 A | 10/1996 | Cmar | |
| 5,576,700 A | * 11/1996 | Davis et al. | 340/825.16 |
| 5,627,759 A | * 5/1997 | Bearden et al. | 364/483 |
| 5,684,710 A | * 11/1997 | Ehlers et al. | 364/492 |
| 5,897,607 A | * 4/1999 | Jenney et al. | 702/62 |
| 5,933,092 A | * 8/1999 | Quellette et al. | 340/870.02 |
| 5,974,369 A | * 10/1999 | Radtke et al. | 702/199 |
| 6,047,274 A | * 4/2000 | Johnson et al. | 705/412 |
| 6,088,659 A | * 7/2000 | Kelley et al. | 702/62 |
| 6,094,622 A | * 7/2000 | Hubbard et al. | 702/61 |
| 6,112,159 A | * 8/2000 | Bond et al. | 702/61 |
| 6,122,603 A | * 9/2000 | Budike, Jr. | 702/182 |
| 6,147,484 A | * 11/2000 | Smith | 324/142 |
| 6,157,874 A | * 12/2000 | Cooley et al. | 700/295 |

FOREIGN PATENT DOCUMENTS

EP          0 614 088 A1    9/1994

OTHER PUBLICATIONS

Brochure, "Sinaut Aces: Accounting, Contracts and Energy Scheduling", 4 pages, Siemens Energy & Automation, Inc. (1994).
Brochure, "ExoTran$^{SM}$ Solution", 3 pages, ExoLink Corporation (1997).

(List continued on next page.)

Primary Examiner—Marc S. Hoff
Assistant Examiner—Carol S Tsai
(74) Attorney, Agent, or Firm—Merchant & Gould P.C.

(57) ABSTRACT

A system for scheduling the generation of energy in an energy distribution network having a plurality of customers and a plurality of energy sources, wherein the customer chooses an energy provider from which to receive its energy. The system comprises memory in communication with the input. The memory is configured to store a schedule for each customer, the schedule setting forth the predicted energy consumption for that customer over a predetermined period of time. A processor is in communication with the memory. The processor is configured to sum the schedules for each energy provider thereby creating a load schedule for each energy provider. An output interface is in communication with the processor. The output interface is configured to output each of the load schedules.

41 Claims, 12 Drawing Sheets

OTHER PUBLICATIONS

Brochure, "LODESTAR Profile and Settlement System™: The New Standard for Open Access Settlement", 4 pages, Utility Marketing Services, Peabody, Massachusetts (date unknown).

Cohn, N., "Decomposition of Time Deviation and Inadvertent Interchange on Interconnected Systems, Part I: Identification, Separation and Measurement of Components", *IEEE Transactions on Power Apparatus and Systems,* PAS–101(5):1144 (May 1982).

Cohn, N., "Decomposition of Time Deviation and Inadvertent Interchange on Interconnected Systems, Part II: Utilization of Components for Performance Evaluation and Corrective Control", *IEEE Transactions on Power Apparatus and Systems,* PAS–101(5):1152 (May 1982).

Internet, "EnergyWeb™: Energy Use Monitoring and Management via the World Wide Web", 2 pages, Electrotek Concepts, Inc. (Last updated May 2, 1997).

Internet, "OG&E: Utility Deregulation Plans Spur Technology Transformation", 2 pages, IBM Corporation (1997).

Internet, "Siemens: Deregulation Products/Siemens PSC, USA", 3 pages, Siemens Power Systems Control (Last updated Feb. 16, 1998).

Internet, "ACES® Your ISO Scheduling Solution", 2 pages, (Last updated Apr. 11, 1998).

Internet, "Utiligent: The Network Advantage: Product Description", 2 pages, Utiligent, (printed Jul. 7, 1998).

Internet, "The Road Ahead: Cegelec ESCA's Strategy and Outlook for Deregulation in the Electric Utility Industry", 4 pages, Cegelec ESCA Corporation, Bellevue, Washington (Last updated Jul. 9, 1998).

Internet, "Welcome to Unified", Welcome to Unified Information, Inc. (Last updated Aug. 12, 1998).

Internet, "NSR: National Systems & Research Co.", 3 pages, National Systems & Research Co., Colorado Springs, Colorado (printed Aug. 14, 1998).

Internet, "Energy Scheduling and Accounting: Energy Management Application", Bailey Network Management, 3 pages, (printed Aug. 18, 1998).

Internet, "Energy Scheduling and Accounting", 2 pages, Bailey Norge AS (Aug. 20, 1998).

Manual, Operating Manual of NERC—National Electric Reliability Council, "Policy 1—Generation and Control and Performance," pp. 1–11; "Policy 3—Interchange," pp. P3–1—P3–9; and "Inadvertent Interchange Accounting Training document," pp. INAD–1—INAD–6 (Dec. 3, 1996, Jan. 5, 1998, and May 24, 1994, respectively).

Press Release, "Logica to Provide Services to New England Electric System (NEES) Companies to Enable Retail Electric Competition", 2 pages, Logica Inc., (date unknown).

Prowse, D. et al., "Experience with Joint AGC Regulation", *IEEE,* 1 page (1994).

Rutz, W., "Power Supply Coordinator: The Power of Retail Choice", *Energy Market IT Bulletin,* No. 5, 4 pages (Mar. 5, 1998).

* cited by examiner

ENERGY COORDINATION SYSTEM

TECHNICAL FIELD

The present invention is related to an energy coordination system, and more particularly, to an energy coordination system that facilitates a customer's ability to choose its energy provider.

BACKGROUND

The traditional model for electric utilities is shown in FIG. 1. In this model, an electric utility serves energy users or customers 108 (i.e., load) with its own facilities 100, which includes a generator 102, a transmission network 104, and a distribution network 106. A transformer station 105 is connected between the transmission network 104 and the distribution network 106. A customer 108 cannot choose between alternative sources of energy. The customer 108 must buy energy from the utility that operates in its geographic region.

Referring to FIG. 2, power grids 110 and 112 are organized into Control Areas 114 and 116, respectively, which are electrical systems bounded by interconnection (i.e., tie-line) metering 118 and telemetry. The load between adjacent Control Areas 114 and 116 is balanced according to a predetermined schedule. If excess demand for electricity is generated in one Control Area 114, it will receive electricity from adjacent Control Areas 116, which disrupts the balance. Generators 120 and 122 in the Control Areas 114 and 116 must then adjust their generation to return the balance to zero. The Control Area 116 that is providing the excess electricity then bills the other Control Area 114 for expenses caused by the deviation.

A problem with this current model of electric utilities is that there is not currently any way to allocate the billings for the deviation in an amount proportional to the individual customer's deviation. Rather, the cost of the deviation is divided among all of the customers regardless of whether their usage exceeded a predictable amount. Another problem is that customers who do exceed their predicted load cannot freely choose the generator, or the Control Area, from which they receive electricity to meet their excess demand.

In an effort to stimulate competition and lower energy prices, the electric utility industry is being deregulated. In theory, deregulation will allow energy users to freely choose the provider from which they purchase energy. However, most models for the deregulated utility industry only permit limited customer choice. One reason is that full customer choice is not possible without a system and method of universally scheduling load and generation, controlling the distribution of energy, and accurately allocating deviations to the customers and generators that created them.

Accordingly, there is a need for a system that provides universal scheduling of energy generation and load. There also is a need for a system that provides universal control over the generation of energy. There is a related need for a system that allows customers to choose their energy providers, the type of metering that they use, the frequency at which they change energy suppliers, the number of simultaneous suppliers from which they receive electricity, and the load following providers that adjust their generation to compensate for the customers being above or below their preschedules or anticipated energy usage. There is yet another need for a system that permits customers to easily switch suppliers by telephone or computer. There is also a need for a system that can track customers' deviation between actual usage and scheduled usage.

SUMMARY

The present invention is directed to a system for scheduling the provision of energy in an energy distribution network having a plurality of energy users receiving energy from at least one of a plurality of energy sources. The system comprises memory in communication with the input. The memory is configured to store at least one schedule for each energy user. Each schedule sets forth the predicted energy usage over a predetermined period of time. A processor is in communication with the memory. The processor is configured to sum the schedules of a predetermined set of energy users thereby creating a net schedule.

Another embodiment of the present invention is directed to a system for allocating the deviation between an energy user's predicted energy usage and the energy user's actual energy usage. The system comprises means for receiving meter readings of actual energy consumption for the energy user. Memory is in communication with the means for receiving meter readings. The memory is configured to store a schedule of anticipated energy usage for a predetermined period and to store the energy users' meter readings. A processor is in communication with the memory. The processor is configured to calculate the difference between the schedule and the meter readings thereby forming a deviation between anticipated energy use and actual energy use for each energy user.

Yet another embodiment of the present invention is a method for scheduling the generation of energy in an energy distribution network having a plurality of energy users receiving energy from at least one of a plurality of energy sources. The method comprising the steps of: storing a schedule for each energy user, each schedule setting forth the predicted energy usage for that energy user over a predetermined period of time; and summing the schedules of a predetermined set of energy users thereby creating a net schedule.

Another method that embodies the present invention is for allocating the deviation between an energy user's predicted energy usage and the energy user's actual energy usage. This method comprising the steps of: receiving meter readings of actual energy consumption for the energy user; storing a schedule of anticipated energy usage for a predetermined period; storing the energy users' meter readings; and calculating the difference between the schedule and the meter readings thereby forming a deviation between anticipated energy use and actual energy use for each energy user.

DETAILED DESCRIPTION

Figure 1:
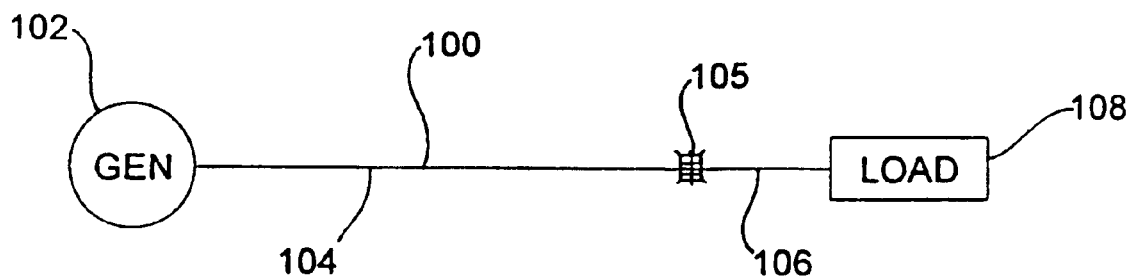
FIG. 1 illustrates the traditional model for a regional electric utility.
Figure 2:
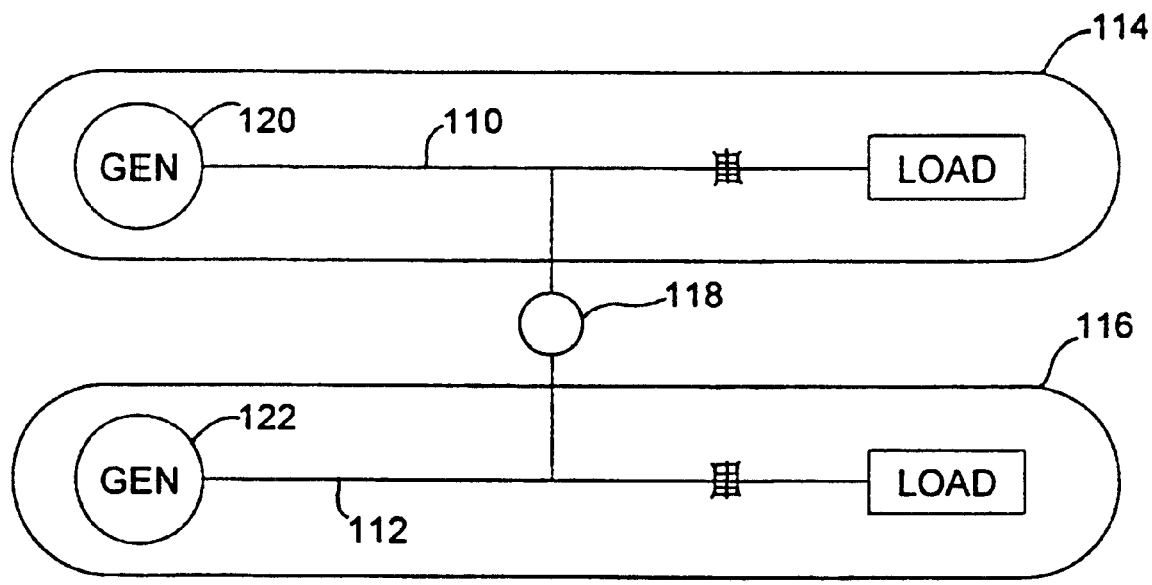
FIG. 2 illustrates the traditional model of a power grid that has the regional electric utilities organized into Control Areas.

Various embodiments of the present invention will be described in detail with reference to the drawings, wherein like reference numerals represent like parts and assemblies throughout the several views. Reference to the various embodiments does not limit the scope of the invention, which is limited only by the scope of the claims attached hereto.

In general terms, the present invention is directed to a system for coordinating various components and entities in a deregulated energy distribution system. Various embodiments of the present invention can be utilized with the generation and/or distribution of many different types of energy, including electricity, natural gas, and petroleum. Furthermore, the present invention can be implemented in many different models for the utility industry and is not limited to the particular module that is described herein. Thus, for example, the invention can be used in a system that does not include an independent system operator as described below.

As stated above, the present invention can have many different embodiments. In one possible embodiment, a system embodying the present invention determines the deviation between each customer's scheduled energy usage and the customer's actual usage of energy. This deviation provides a basis for allocating the cost of deviation to the customers that are actually responsible for the deviation in a prorated amount. Thus, customers pay only for their energy usage and not for the excess usage of other customers. In another possible embodiment, a system embodying the present invention is directed to creating net usage schedules that are used to control the amount of energy output by various generators. Creating and using net usage schedules in this manner helps to maintain balance in the energy distribution system.

An advantage of this system is that it enables a customer to choose its desired source of energy. For example, a customer can choose to continue receiving energy from its traditional energy provider for the geographic area in which the customer is located. The customer can also choose to purchase energy from an alternative energy provider or directly from a generator. In yet another example, a A customer can choose to purchase energy from multiple and different sources depending on a variety of factors such as the time of day, the day of the week, or whether the customer's actual energy usage is exceeding its scheduled usage.

Figure 3:
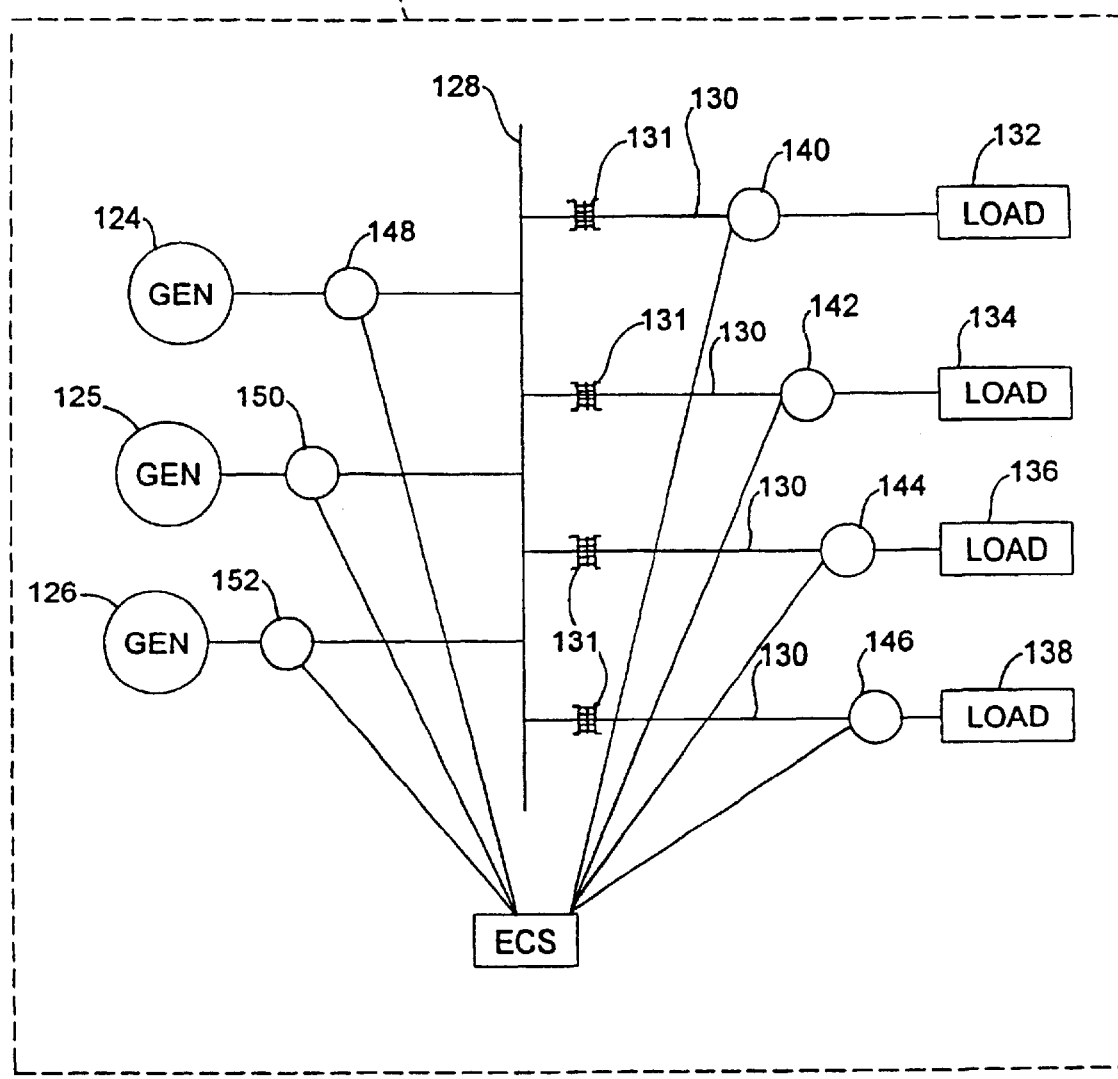
FIG. 3 illustrates one possible model for a power system that utilizes a computer system embodying the present invention.

Referring now to the drawings, FIG. 3 illustrates one possible model of a power system 123 that utilizes the present invention. In this power system 123, a plurality of generators 124, 125, and 126 generate energy into a transmission network 128. A distribution network 130 receives energy from the transmission network and distributes the energy to the loads 132, 134, 136, and 138. A transformer station 131 is positioned between the transmission network 128 and the distribution network 130. The loads 132, 134, 136, and 138 can be any type of customer, or combinations of different types of customers, including residential, commercial, and industrial customers. There are meters 140, 142, 144, and 146 that measure the flow of energy between the distribution network 130 and the loads 132, 134, 136, and 138. There are also meters 148, 150, 152 that measure the flow of electricity between the generators 124, 125, and 126 and the transmission network 128. A computer system 220 is interfaced with, or electrically connected to, the meters 140, 142, 144, 146, 148, 150, and 152.

Figure 4:
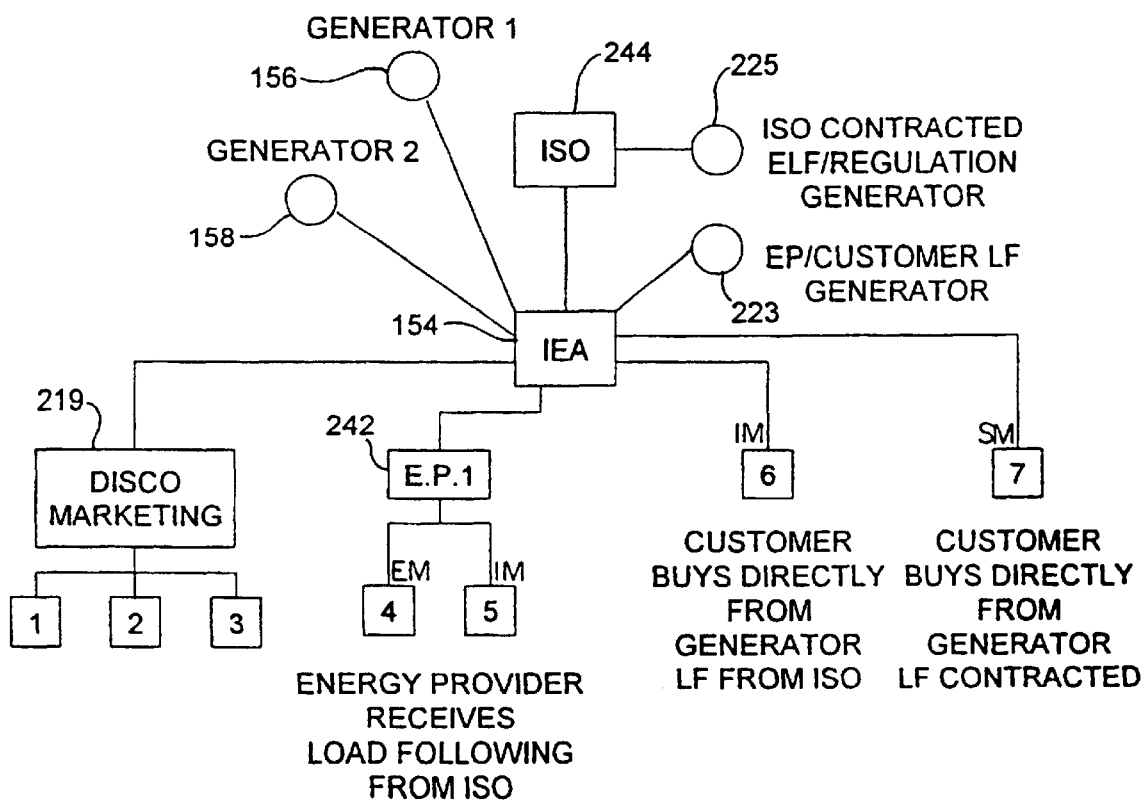
FIG. 4 illustrates organization of components in one possible model of a deregulated utility industry that utilizes the power system shown in FIG. 3.

FIG. 4 illustrates one possible structure of the electric utility industry in a deregulated environment in which a customer 1-7 can choose its own source of electricity. Within this system, a customer 1-7 can choose to keep receiving energy from its regional DISCO 219, which is the traditional regional utility, or choose to switch to an alternative energy provider 242.

An Independent System Operator (ISO) 244 is a regional organization that operates the transmission network 130 independently of its owners. The ISO 244 can operate transmission networks owned by several different companies or a single transmission network. Analogously, the ISO 244 can encompass several Control Areas, a single Control Area, or combine several Control Area into a larger unitary Control Area. The ISO 244 is responsible for the reliability of the networks within its system and have contracted with a generator 225 that will provide load-following services. The load-following generator 225 with whom the ISO is associated is the default generator that provides excess electricity when demand exceeds the load scheduled for >the network. Although the ISO is described as performing these functions, other structures of the utility industry are possible in which other entities, such as the Control Areas themselves, perform these functions.

Another organization such as an independent energy accountant (IEA) 154 provides a central control that coordinates all of the components for the ISO 244. Accordingly, the IEA 154 operates the computer system 220 and provides account switching, short-interval scheduling, and deviation accounting.

The IEA 154 communicates with the ISO 244; generators 156 and 158; the regional DISCO 219; energy providers 242 that receive load-following from the default generator 225; energy providers 242 that contract with alternative load following generators 223; customers, such as customer 6, that choose to contract directly with a particular generator for either their main supply of energy 156 or 158 or their load following energy provider 223; and customers, such as customer 7, that have short-interval metering. In an alternative model of the energy industry and the system configuration, control or coordination is provided by an entity other than the ISO 154. Examples of other entities include an independent energy scheduling service or a distribution company.

Figure 5:
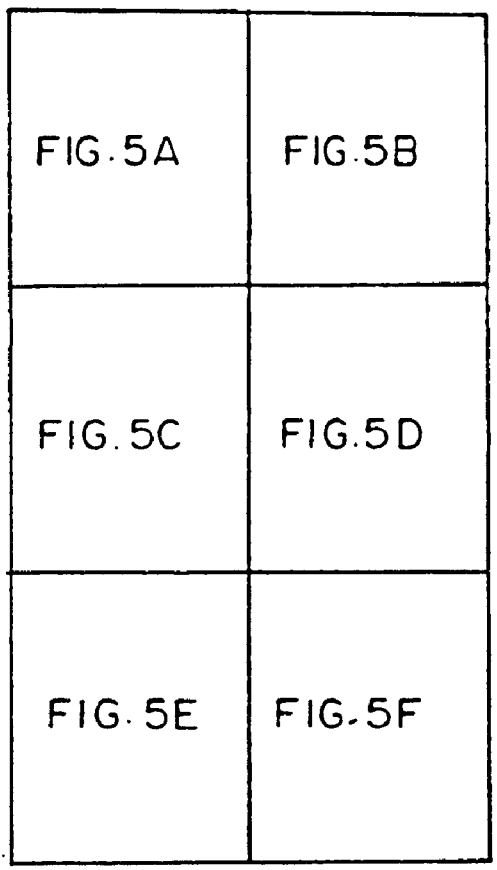
FIG. 5 is a functional block diagram illustrating one possible embodiment of the computer system shown in FIG. 3.

Referring to FIG. 5, the computer system 220 interfaces with energy meters 200, after-the-fact interval meters 202, short-interval meters 204, and generator meters 206. Energy meters 200 do not have load-profile recorders and typically are used for residential customers. After-the-fact interval meters 202 have built in load-profile recorders and typically have dial-up communications with an entity that has a meter translation system such as a DISCO. After-the-fact interval meters 202 typically are used for commercial and light industrial customers. Short-interval meters 204 record energy on a near real-time basis. Short-interval meters 204 typically are used for large industrial customers. Generator meters 206 track the output of generators on a near real-time basis.

Meters operating on a near real-time basis take measurements at relatively short intervals, such as five minute intervals. However, the length of the interval can vary depending on a variety of factors such as the capabilities of the meter, the capacity of the communication system to which the meter is linked, and the number of customers. The shorter the interval between readings the closer that the system is to achieving true real-time measurement. In some possible configurations, therefore, near real-time is synonymous with real-time if the intervals are short enough.

A meter translation system 210 includes a communication interface 212, a meter data translation and processing system 214, a high precision time base 216, and a customer load profile history database 218. The communication interface 212 provides an interface for after-the-fact meters 202.

The communication interface 212 dials up and polls the individual after-the-fact meters 202 that are installed at various customers. Each after-the-fact meter 202 generates a metered load profile, which is a profile of actual usage that charts actual use over a period of time. That period of time can have various intervals such as 1 day, 1 week, or 1 month. When polled by the meter translation system 210, after-the-fact meters 202 download into the meter data translation and processing unit 214 both their metered load profile and the meter reading for the end of the profiled interval. The meter profiles as well as the actual meter readings at the start and stop of the profiled interval are stored in the customer load profile history database 218.

The time base 216 receives time from a precision atomic clock source. This high precision time is used to synchronize the clock in each of the after-the-fact meters 202.

The standard energy meters 200 are typically read by a meter reader and input into a hand-held meter reading microcomputer 201. This hand-held meter reading microcomputer 201 is interfaced with the DISCO's electronic meter reading system 208. If the customer has not elected to switch to an alternative energy provider, the meter readings are input into the DISCO's billing system 203 and the DISCO 219 will generate billing for that customer in a manner that is known in the art. If the customer has elected to switch energy providers, the data from the DISCO's meter reading system 208 is input into the meter data and translation and processing 214 of the meter translation system 210. In an alternative embodiment, the meter readings are also stored in the customer load profile history database 218. In yet another alternative configuration, the DISCO meter reading system 208 communicates meter readings from switched customers directly to the first input interface 205 of the computer system 220, which is described in more detail below, rather than communicating the meter readings to the meter translation system 210.

The computer system 220 includes a deviation accounting processor 222; a schedule processor 224; first, second, and third input interfaces 205, 226, and 228; first and second output interfaces 215 and 230; a real-time database 232; a relational database 234; a reconciliation processor 211; a customer verification processor 209; and a prescheduling processor 213. Within this system, the second input interface 226, the schedule processor 224, the real-time database 232, and the second output interface 230 form a real-time processor 231 that enables the computer system 220 to quickly respond to changes in customer demand so that the generators can adjust the amount of energy that they generate and minimize any imbalances. The processors described herein can be computer programs or portions of programs such as routines or objects.

The relational database 234 stores information relating to demographics, energy metered customers, after-the-fact interval metered customers, short-interval metered customers; generators, including load following suppliers; and energy providers. Demographic information that is stored in the relational database includes data regarding generators, energy providers, and customers that have switched to an energy provider other than their geographic DISCO. Each of the generators, energy providers, and customers is represented by a flag, code, or character string. The relational database 234 creates relationships between generators and energy providers that have energy supply contracts, customers and energy providers that have energy supply contracts, and customers and generators that have energy supply contracts. In one possible embodiment, the relational database also contains information regarding the interval during which the generator or energy provider is scheduled to supply energy.

Data stored in the relational database 234 regarding energy metered customers 200 includes preschedules, temperature coefficients, adjusted schedules, actual monthly meter readings, reconciled schedules, and deviations. Data regarding after-the-fact interval metered customers 202 includes preschedules, temperature coefficients, adjusted schedules, metered load profiles, and deviations. Data regarding short-interval metered customers 204 includes preschedules, metered load profiles, and deviations. Data regarding the generators 206 includes preschedules, adjusted schedules, metered generation profiles, and deviations. Data regarding the energy providers 242 includes preschedules, temperature basis by zip code, the net of adjusted schedules and short-interval metering for the energy provider's customers, a net of reconciled and metered load profiles, and deviations.

The temperature basis is the predicted temperature. The temperature coefficient is a factor that is added to the preschedule for every degree that the actual temperature differs from the temperature basis. It accounts for increased (or decreased) energy usage caused by climate control units such as air conditioners that result from unexpected temperature swings. There is a separate temperature coefficient for each customer. Additionally, the temperature coefficient is determined through statistical sampling based upon a customer's, or a sampling of similar customers', historic energy usage.

For example, if the temperature basis is 60° and the actual temperature is 70°, a customer has a first temperature coefficient that is added to the preschedule 10 times, once for every degree that the actual temperature exceeds the temperature basis of 60°. If the temperature basis is 80° and the actual temperature is 85°, the same customer will have a different temperature coefficient that is added to the scheduled energy usage 5 times, once for every degree that the actual temperature exceeds the temperature basis of 80°. Knowledge on how to compute these coefficients is well known in the art.

The first input interface 205 receives data from the meter data translation and processing system 214 and loads that information into the relational database 234. This data includes the current metered load profiles for after-the-fact metered customers 202 and actual meter readings for energy metered customers 200. In the event that there is a failure in the communication between the meter translation system 210 and the after-the-fact meters 202, a historical metered load profile will be communicated from the customer load-profile database 218 to the first input interface 205.

The second input communication interface 226 is a near real-time interface that polls the short-interval meters 204 that are installed at customers' facilities and generator meters 206. The short-interval meter values, are then downloaded from the second input interface 226 to the near real-time database 232. The second input interface 226 also receives adjusted schedules from other ISOs and IEAs 217. This information is used to schedule and maintain a balance between Control Areas and for billing purposes if there is an imbalance created between the Control Areas. The information also enables customers and energy providers from other Control Areas to purchase energy from a generator 206 in the Control Area of the computer system 220.

Each generator has a generator prescheduling processor 236 that generates a preschedule of electricity that it plans to generate for a predetermined period. Similarly, each energy provider 242 has a load prescheduling processor 238 that generates schedules or preschedules for each of its customers. Each preschedule is created through statistical sampling based upon a customer's, or a sampling of similar customers', historic energy usage. Additionally, each preschedule corresponds to the energy that the energy provider 242 expects to provide to the customer for which the preschedule is created. The preschedules are communicated to the second input interface 228 by means such as e-mail or other electronic communications, and are then stored in the relational database 234. The preschedule can cover any future period. In one possible embodiment, however, the preschedules cover a 24-hour period and are created one day in advance of the period that the schedule covers.

The prescheduling processor 213 retrieves all of the preschedules for a given energy provider from the relational database 234. The preschedules are then summed by Control Area 244, energy provider 242, and DISCO 219 to create net preschedules. The net preschedules are stored in the relational database 234 and communicated to the ISO 244, the DISCOs 219, the energy providers 242, and the load following generators 223 via the first output interface 215.

The schedule processor 224 generates a net adjusted schedule for each of the energy providers 242. The net adjusted schedule is the schedule of the amount of electricity that customers of the energy provider 242 expect to use during a given period of time. The net adjusted schedule includes information for all of the energy provider's 242 customers, including short-interval metered customers 204, after-the-fact metered customers, and energy metered customers 200. In generating the net adjusted schedule for an energy provider 242, the schedule processor 224 retrieves the customer data and the preschedule for all of the energy provider's 242 customers, including the short-interval metered customers 204, after-the-fact metered customers 202, and energy metered customers 200.

The schedule processor 224 also retrieves actual weather data from a weather service 240 and the corresponding temperature coefficients from the relational database 234. An example of possible weather data that is retrieved from the weather service includes the actual temperature by zip code. The scheduling processor 224 then creates an adjusted schedule by adjusting the preschedules for after-the-fact interval metered customers 202 and energy metered customers 200 on an hourly basis using the temperature coefficient correspondence to the temperature basis and the most recent actual temperature that the computer system 220 has received.

The schedule processor 224 also compiles a metered load profile for each of the short-interval customers 206. The metered load profiles of the short-interval metered customers 206, the adjusted schedules for after-the-fact metered customers 204, and the adjusted schedules for energy metered customers 200 are summed to create the net adjusted schedule.

This process of calculating the net adjusted schedule is periodically performed for each of the generators, energy providers, Control Areas, DISCOs, and other IEAs. In one possible configuration, a new net adjusted schedule is created every five minutes to provide a near real-time schedule so that generators can periodically adjust the amount of energy they are providing to minimize energy imbalance. In another configuration, a new net adjusted schedule is calculated in intervals other than five minutes, depending on a variety of factors including communication between the computer system 200 and the peripheral systems as well as processing demands placed on the computer system 200. The interval could be less than five minutes or considerably greater than five minutes.

The scheduling processor 224 also periodically creates an inter-IEA/Control Area schedule. This schedule is used to update information about the balance between Control Areas and inform any contracted generators in other Control Areas of the size of the load that they need to generate to serve customers in their host Control Area.

The scheduling processor 224 stores the weather information, preschedules, adjusted schedules, and short-interval metered load profiles in the real-time database 232. Storing this information in the real-time database 232 enables the schedule processor 224 to quickly retrieve it for updating or adjusting the schedules. The schedule processor 224 also stores the short-interval metered load profiles and the adjusted schedules in the relational database 234 to create a historical record of data.

The net adjusted schedule is output from the schedule processor 224 via the second output interface 230 to the energy providers 242, the ISO 244, the load following providers 223, the DISCO 219, and other IEAs and Control Areas 221 that might have a need for the adjusted schedule. The energy providers 242 can use this information for a variety of purposes such as computing an alternate net adjusted generation schedule, keeping historical records, billing purposes, and accounting purposes. The alternate net adjusted schedule is an alternate generation schedule that determines how much to adjust the energy being purchased from generators and load following generators as the deviations are determined. The alternate net adjusted schedule is then communicated back to the real-time database 232 via the second input interface 226. The scheduling processor 224 then uses this information to adjust the schedules of the appropriate generators and load following generators.

In an alternative embodiment, the alternate net adjusted generation schedule is also communicated directly from the energy providers 242 to the load following generators 223. The load-following generators can use the alternate net adjusted generation schedule for billing and to quickly adjust their generation to match customer demand and maintain balance of the system.

The ISOs 244 use the net adjusted schedule as a measure of the amount of energy that must be available on the network at any given time. The ISO 244 compares the net adjusted schedules with the net preschedules to assist in maintaining reliability. This comparison, for example, is used to determine how much energy the load-following generators must provide in order to meet customer demand and maintain a balanced power system. In another example, this comparison is used to adjust the output of load-following generators with whom customers have contracted 223 in order to minimize dependence on the ISO's default load-following generators 225 to meet demand and balance the power system.

The second output interface 230 also communicates in near real-time the net adjusted schedules to load-following generators 223 with whom particular energy providers have independently contracted. In this situation, the individual contracted load-following generator 223 will increase or decrease generation of energy to follow the energy provider's or customer's adjusted schedule.

Inter-Control Area schedules are communicated from the second output interface 230 to the other IEAs and Control Areas 221, which use this information for generating their own load schedules. This information permits a customer or energy provider in one Control Area to contract with a generator in another Control Area. This information is also used to schedule and maintain a balance between adjacent Control Areas and for billing purposes if the load between adjacent Control Areas becomes unbalanced.

The net preschedules and adjusted schedules for all of the switched customers within each DISCO are transmitted to the DISCOs 219. Each DISCO can then use this information to calculate its own preschedule. The DISCO 219 also receives each energy provider's net preschedule from the first output interface 215.

The reconciliation processor 211 retrieves the adjusted schedule or schedules and actual monthly meter readings for every energy metered customer 200 from the relational database 234. The reconciliation processor 211 then uses the actual monthly meter reading to scale the adjusted schedule for each customer and create a reconciled schedule. The amount of energy represented in the reconciled schedule is substantially equivalent to the energy metered customer's actual usage. In one possible embodiment, the total amount of energy represented in a customer's or energy user's reconciled schedule corresponds to the customer's total monthly consumption of energy. The reconciled schedule is stored in the relational database 234.

The deviation processor 222 calculates the deviation between the adjusted schedule and the actual energy used for each customer and for each generator. The deviation processor 222 retrieves information from the relational database 234 for each customer. For energy metered customers 200, the deviation processor 222 retrieves the adjusted schedule and the reconciled schedule. The deviation processor 222 then calculates the difference between the reconciled schedule and the adjusted schedule, which is the deviation. For after-the-fact metered customers and generators, the deviation processor 222 retrieves the adjusted schedule and the metered load and generation profiles from the relational database 234. The deviation processor 222 then calculates the difference between the metered load profile and the adjusted schedule, which is the deviation. For short-interval metered customers, the metered load profile becomes the adjusted schedule, and there is not a deviation between the adjusted schedule and metered load profile for short interval metered customers. For customers with multiple energy suppliers the deviations for the customers will be divided based on negotiated contracts.

The deviations for individual customers are communicated to each customer's energy provider 242 through the first output communication interface 215 and are stored in the relational database 234. In addition, the net deviation for each energy provider and generator is provided to the ISO 244. The energy provider 242 uses the deviation for each individual customer to allocate the deviation billing from the ISO 244 to the individual customers in an amount proportioned to the customer's individual deviation.

The workstation 246 is used to input demographic information for each customer into the relational database 234. Demographic information can include personal information, the identity of the primary energy provider with whom the customer has contracted, and the identity of secondary energy providers with whom the customer has contracted.

The customer verification processor 209 prevents slamming of customers. Slamming occurs when an energy provider 242 switches a customer to its service without the customer's permission. The customer verification processor 209 receives requests from the energy provider 242 for changes in the customer's chosen energy provider. This information can be communicated electronically or directly from the energy provider 242 to the customer verification processor 209. Alternatively, this information can be sent to the IEA, and is then manually input to the verification processor 209 at the work station 246.

Upon receiving a request to switch a customer, the verification processor 209 causes a confirmation request to be generated and sent to the customer 207. The confirmation request can have many possible formats such as a mailing or a digital certificate. Once the confirmation from the customer is received, the verification processor 209 will update the information in the relational database 234 that identifies the customer's 207 new energy provider 242. The confirmation is also communicated to the customer's previous energy provider 242 notifying it that the customer switched to another energy provider 242. The same process as described above will be used of a customer selects an additional energy provider. The change then takes effect after the next meter reading.

Figure 6:
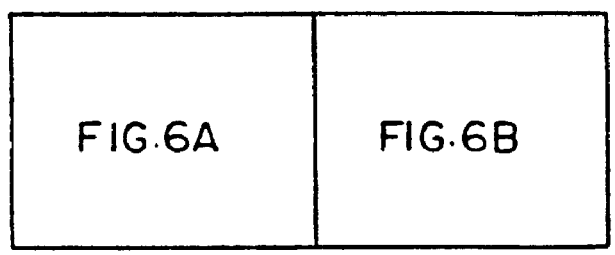
FIG. 6 is a block diagram of one possible embodiment of the hardware for implementing the computer system shown in FIGS. 3 and 5.
Figure 5A:
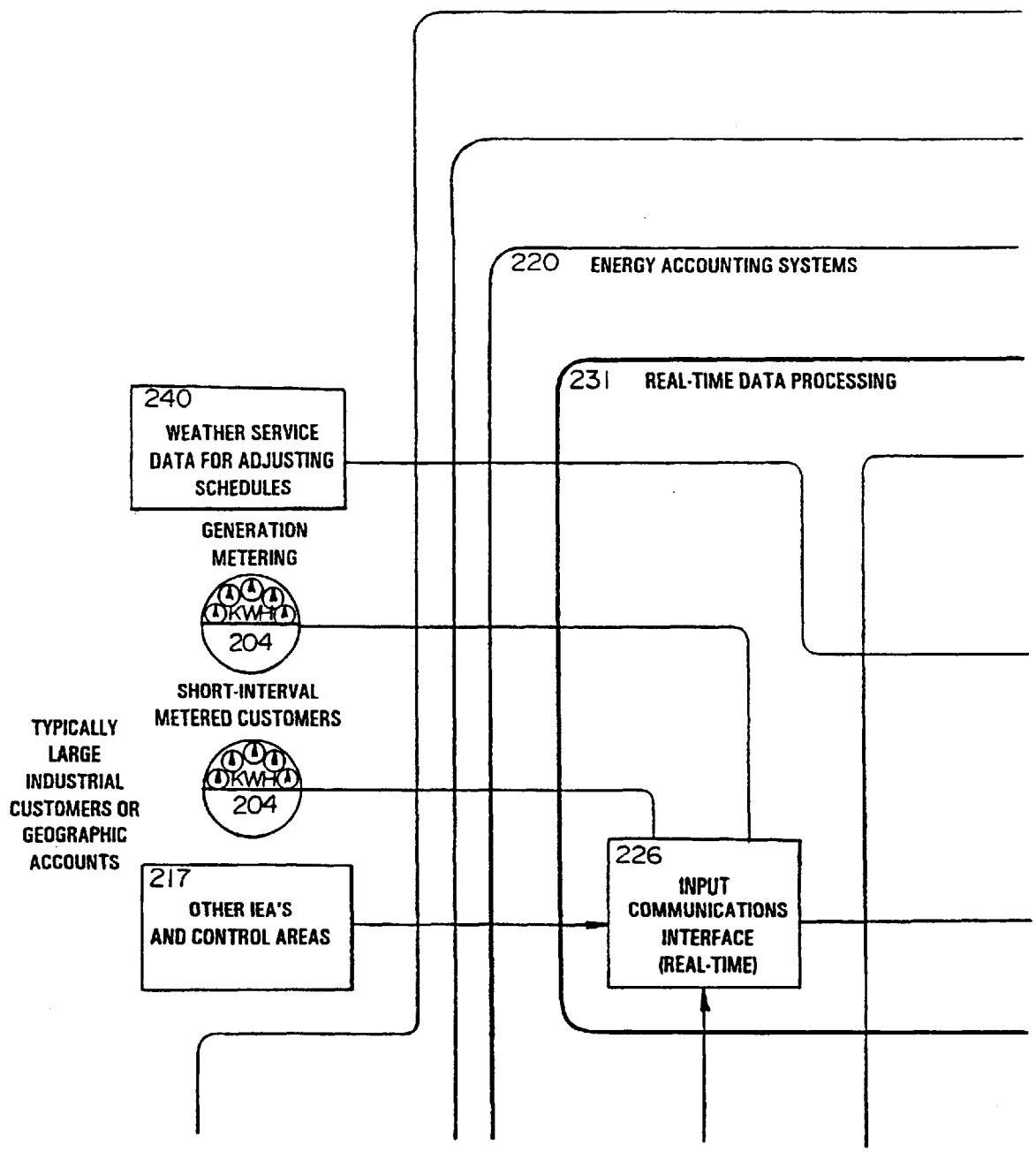
Figure 5B:
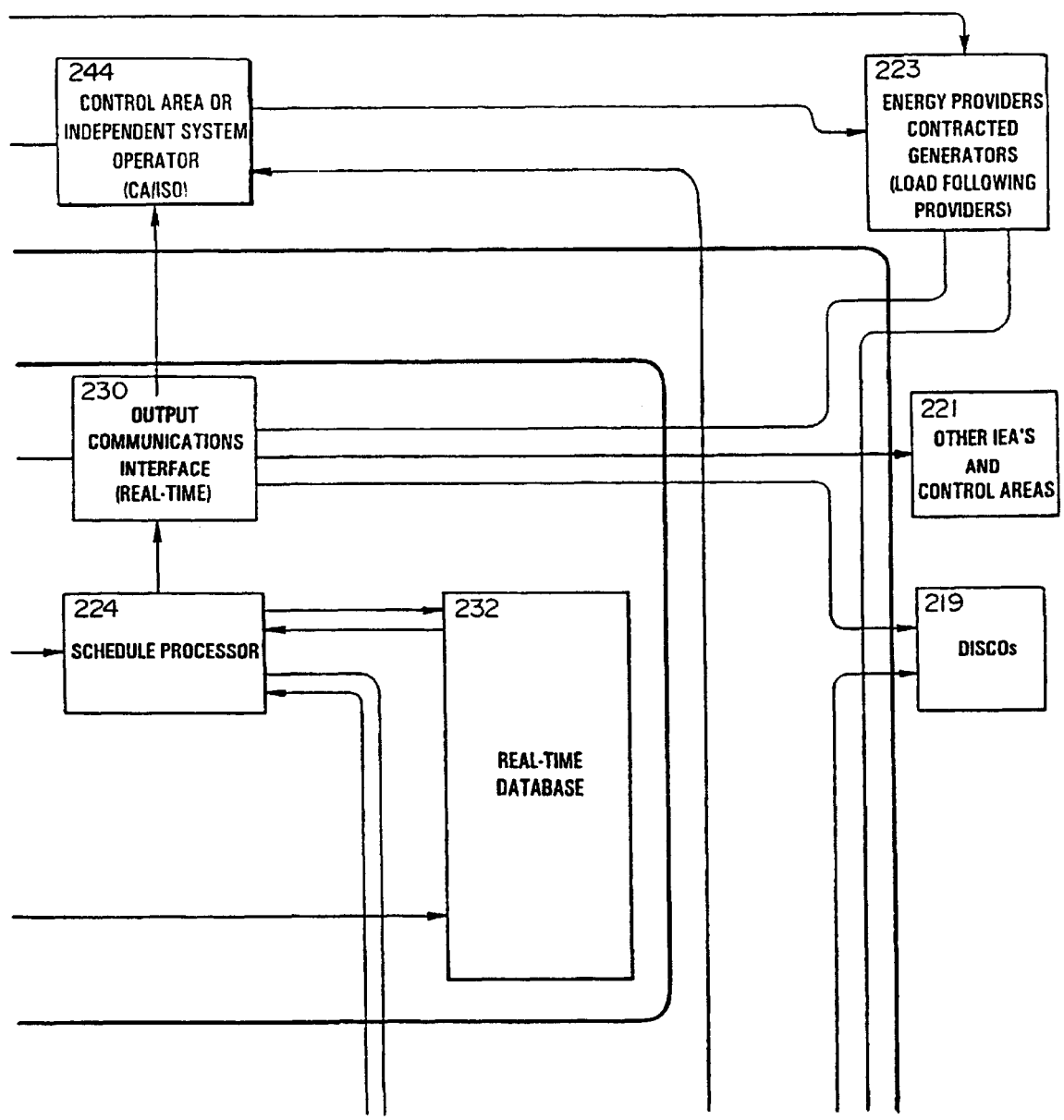
Figure 5C:
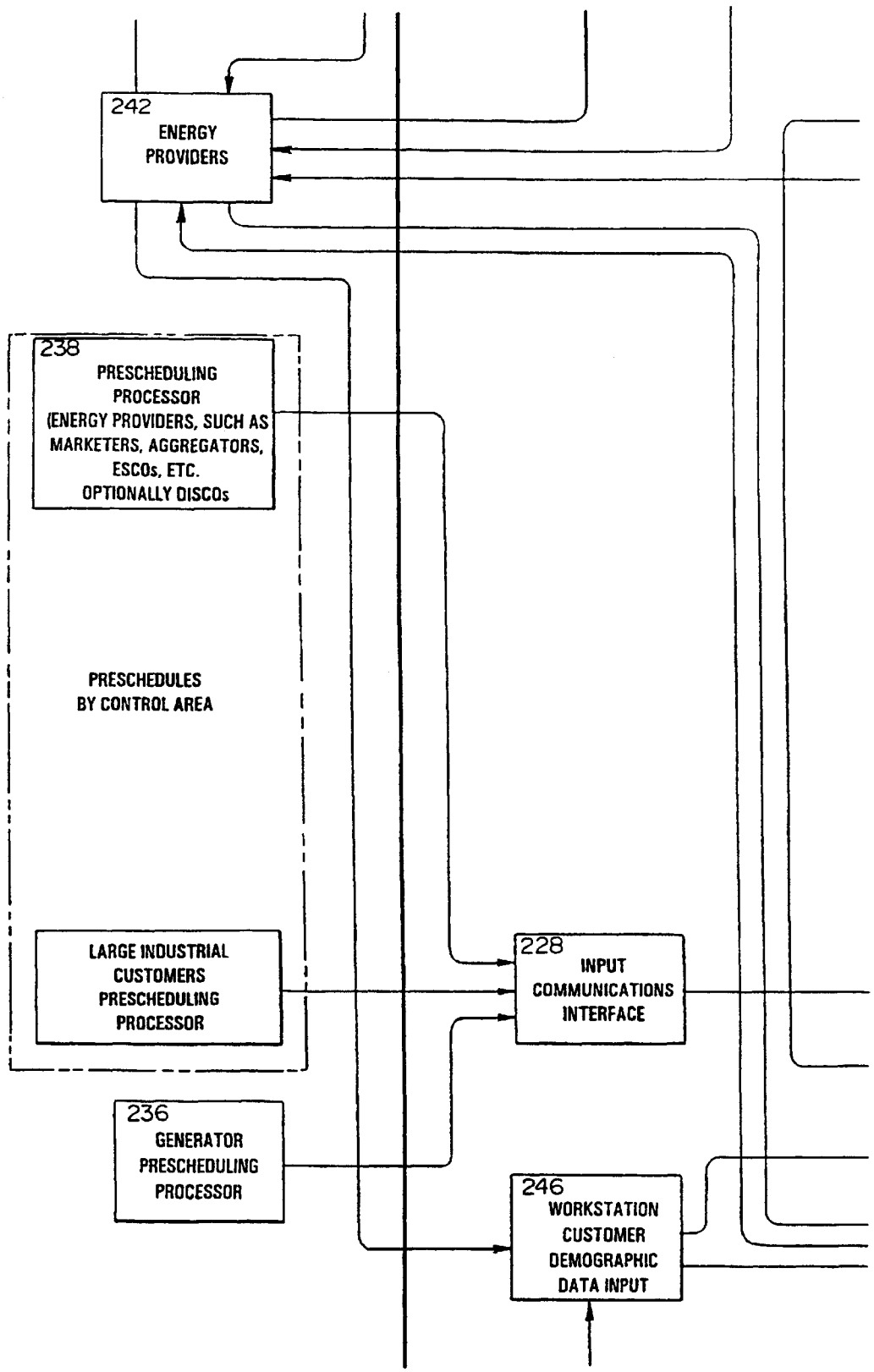
Figure 5D:
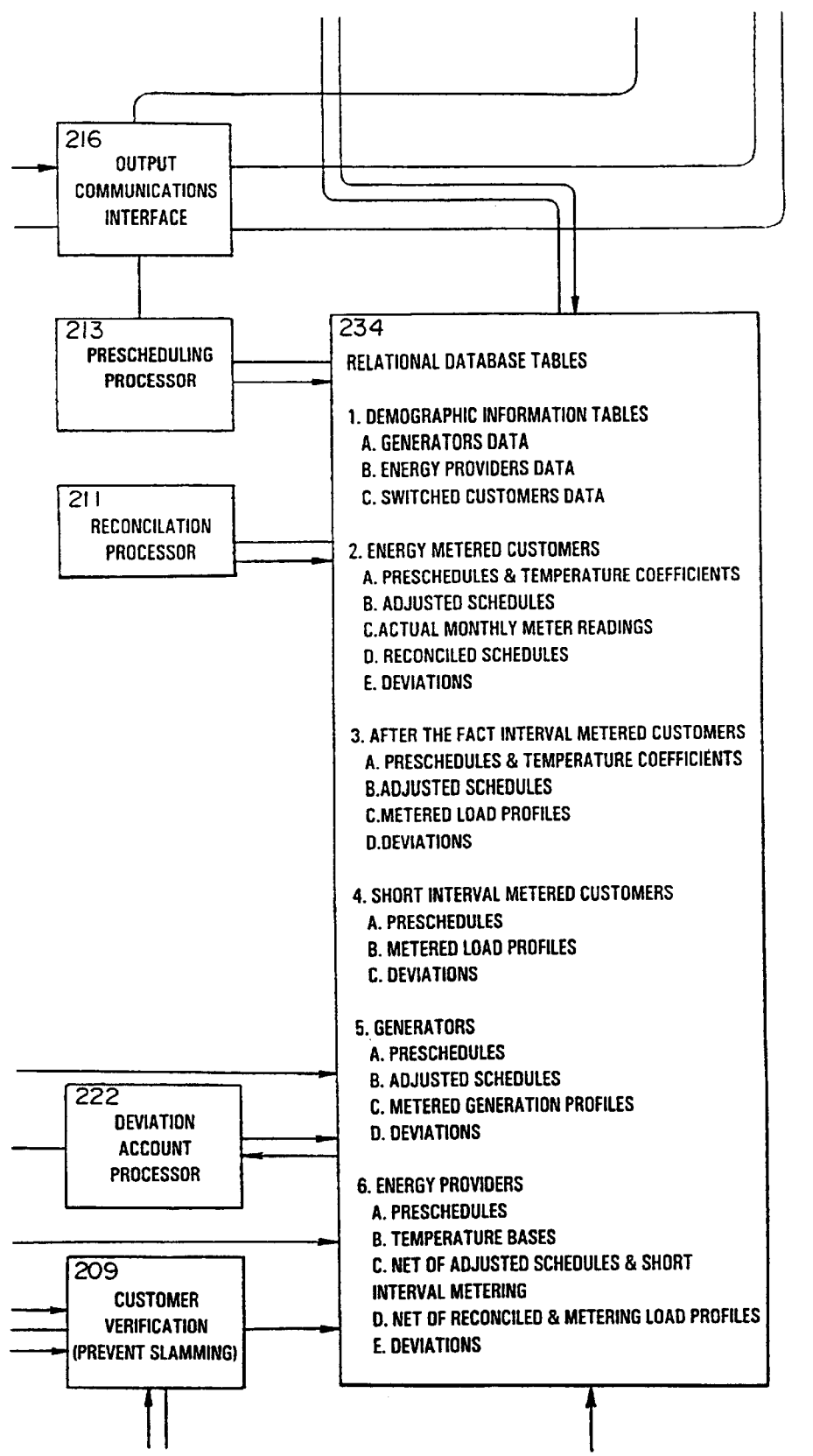
Figure 5E:
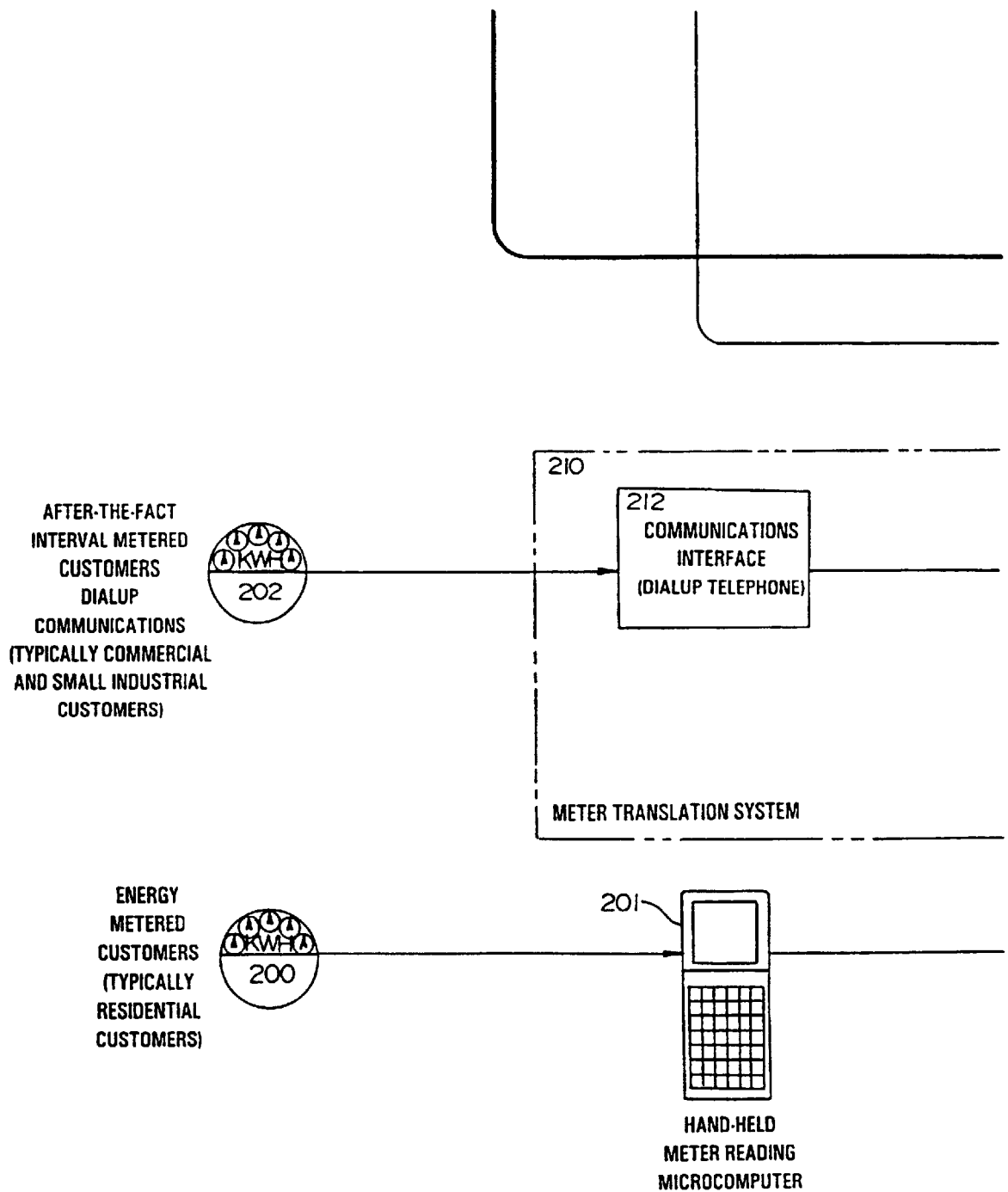
Figure 5F:
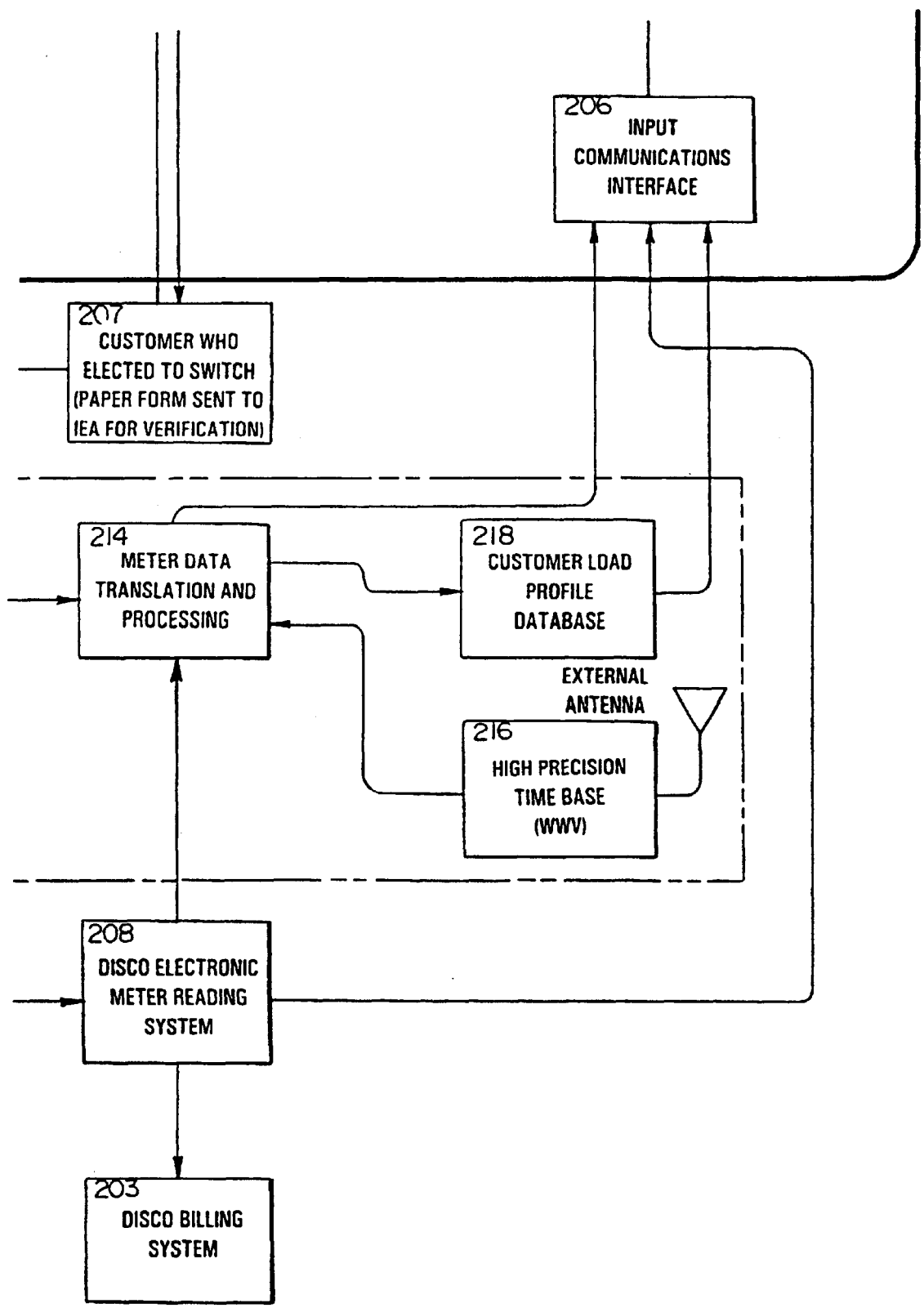
Figure 6A:
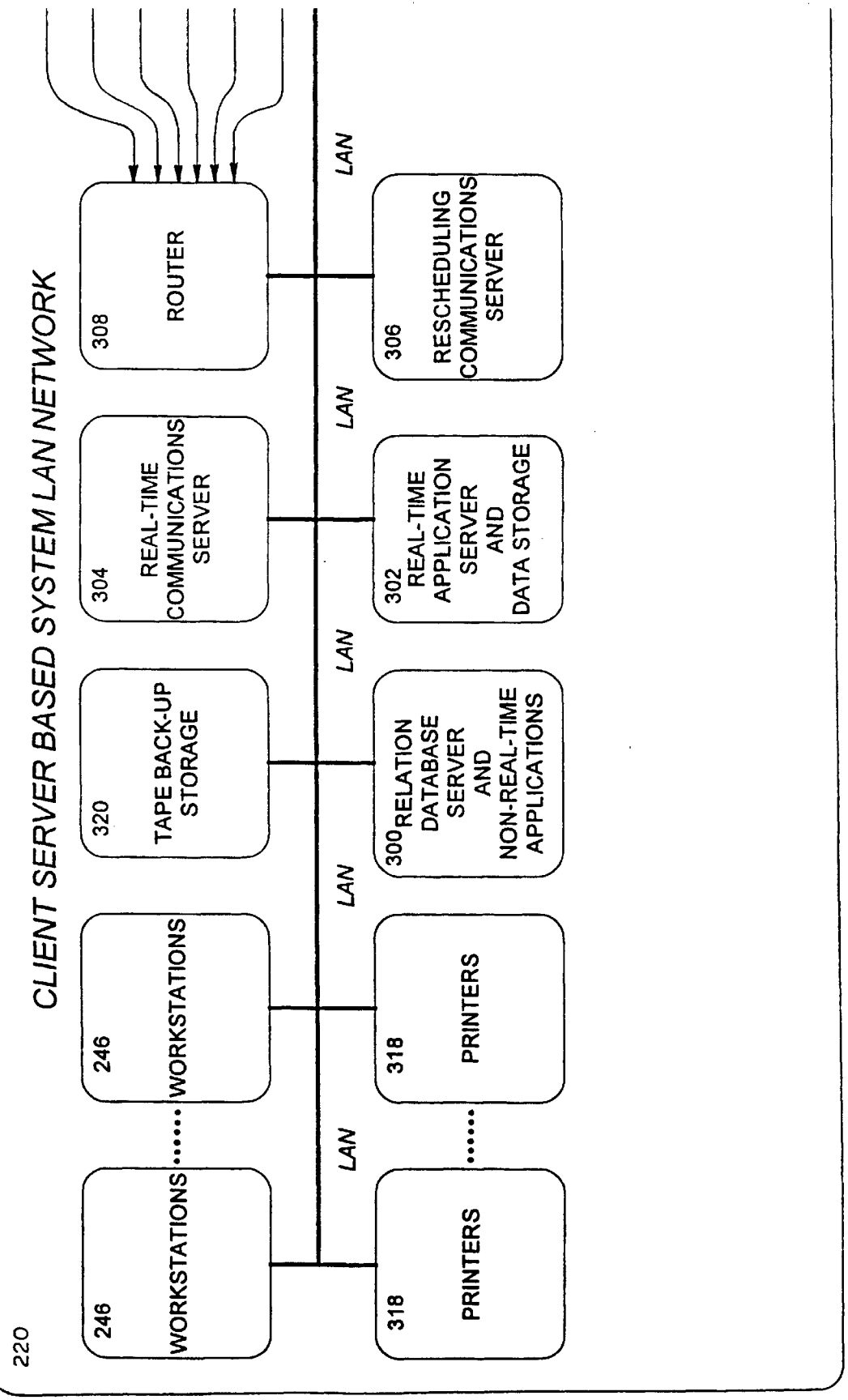
Figure 6B:
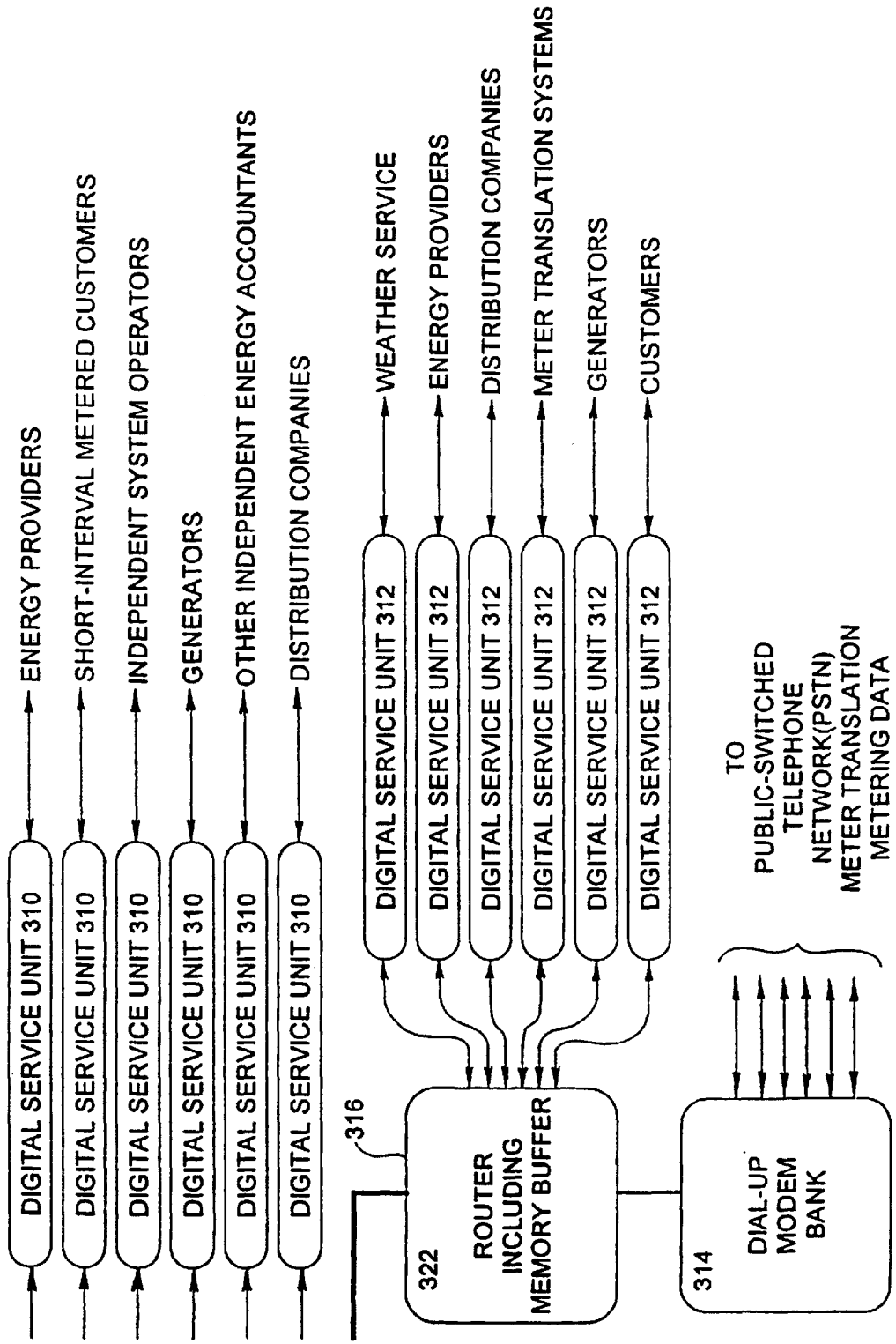

Referring now to FIG. 6, one possible implementation of the computer system 220 has four servers 300, 302, 304, and 306. The first server 300 stores the relational database and executes the non real-time processes. These processes include the customer verification processor 209, deviation accounting processor 222, reconciliation processor 211, and prescheduling processor 213. The second server 302 stores the real-time database and executes the scheduling processor 224, which is a real-time processor. The third server 304 includes the second input and the second output interfaces 226 and 230, which are real-time interfaces. The fourth server 306 includes the first and second input interfaces 205 and 228, and the first output interface 215. In this configuration, execution of the real-time processes is not slowed by processing demands of the non real-time applications or the real-time communication. Similarly, the real-time communication is not slowed by processing demands of the applications or non real-time communication. All four servers 300, 302, 304, and 306 are microprocessor-based systems and run the UNIX operating system, or another similar operating system. In one possible embodiment, the servers have memory and utilize a 400 MHz Pentium II microprocessor with a 100 MHz bus or similar state-of-the art server.

The third server 304 communicates with a router 308. In turn, the router 308 is in communication with a plurality of digital service units 310, which provide an interface with communication links to peripheral systems that have a need to communicate with the computer system 220 on a real-time basis. Examples of peripheral systems that might communicate through the router include energy providers, short-interval metered customers, ISOs, generators, IEAs, and DISCOs. The digital service units 310 provide data translation and drivers. In one possible embodiment, the communication links are direct and dedicated connections such as a T1 span and can form a wide area network. Other embodiments have other types of communication links to peripheral systems.

The fourth server 306 is also communicates with the router 322. In turn, the router 322 is in communication with a plurality of digital service units 312 that provide an interface for communication links that do not have a need to communicate with the computer system 220 on a real-time basis. Examples of peripheral systems that might communicate through the router 322 include the weather service, energy providers, DISCO's, meter translation systems, generators, and customers. In one possible embodiment, these communication links are dedicated lines such as a T1 span. Other embodiments might communicate over some other suitable type of communication network such as the Internet or ISDN lines. Additionally, the router 322 is linked to a modem bank 314, which provides data communication over the public telephone network. Such communication can be used for receiving information such as switching information from customers, monthly translation data from the meter translation system 210, or monthly readings from energy meters received from the DISCO.

The first, second, third, and fourth servers 300, 302, 304, and 306 are connected to a LAN 316 that operates according to the ETHERNET standard, or another standard network configuration. Other peripheral equipment connected to the LAN include at least one work station 246, at least one printer 318, and tape back-up equipment 320 or back-up service. In one embodiment, the work station 246 is a PC computer that includes a 400 MHz Pentium II microprocessor and 100 MHz data bus and operates the Windows NT operating system.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A system for scheduling the generation of energy in an energy distribution network having a plurality of energy users receiving energy from at least one of a plurality of energy sources, the system comprising:
   memory configured to store at least one schedule for each energy user, each schedule setting forth the energy user's predicted energy usage over a predetermined period of time;
   a processor in communication with the memory, the processor configured to sum the schedules of a predetermined set of energy users thereby creating a net schedule; and
   wherein a plurality of schedules correspond to the predicted energy usage of at least one energy user, at least one of the schedules setting forth the at least one energy user's predicted consumption of energy from a first predetermined energy provider and at least one of the schedules setting forth the least one energy user's predicted consumption of energy from a second predetermined energy provider.

2. The system of claim 1 wherein schedules relate energy usage to a predetermined period of time.

3. The system of claim 2 wherein each schedule sets forth the energy user's predicted consumption of energy from a predetermined energy provider.

4. The system of claim 1 wherein each schedule is a preschedule, each preschedule covering a future period of time.

5. The system of claim 1 wherein the processor is configured to recalculate the net schedule for each energy provider after a predetermined interval.

6. The system of claim 5 wherein the interval between recalculations is less than about one hour.

7. The system of claim 5 further comprising an interface in communication with the processor, the interface configured to receive temperature forecasts, wherein:
   the memory is configured to store temperature coefficients, each temperature coefficient corresponding to a particular energy user; and
   the processor is configured to retrieve the temperature coefficient for a particular energy user and adjust the schedules by the temperature coefficients thereby creating adjusted schedules, and to form a net adjusted schedule, the net adjusted schedule being the sum of the adjusted schedules.

8. The system of claim 1 wherein:
   some of the customers are metered by short-interval meters, the short-interval meters being configured to generate load-profiles; and
   at least some of the schedules are load-profiles.

9. The system of claim 1 wherein some of the customers are metered by after-the-fact interval meters, the after-the-fact interval meters being configured to generate load-profiles.

10. The system of claim 1 wherein the energy is electricity.

11. The system of claim 10 wherein the system further comprising an interface configured and arranged to output the net schedule.

12. The system of claim 11 wherein the predetermined set of energy users corresponds to a predetermined generator.

13. The system of claim 11 wherein the predetermined set of energy users corresponds to a predetermined load-following generator.

14. The system of claim 11 wherein the predetermined set of energy users corresponds to a predetermined DISCO.

15. The system of claim 11 wherein the predetermined set of energy users corresponds to a predetermined independent energy provider.

16. The system of claim 11 wherein the predetermined set of energy users corresponds to a predetermined control area.

17. The system of claim 11 further comprising means for outputting the net schedules.

18. The system of claim 1 wherein the processor is a microprocessor.

19. The system of claim 1 wherein the processor is a microcomputer.

20. The system of claim 1 wherein the energy distribution system includes generators and energy providers and the memory includes a database relating each customer to at least one of the energy providers.

21. A system for allocating the deviation between the predicted energy usage for a plurality of energy users and the actual energy usage for the plurality of energy users, the system comprising:
   means for receiving meter readings of actual energy consumption for a plurality of energy users;
   memory in communication with the means for receiving a meter reading, the memory being configured to store a plurality of schedules of anticipated energy usage for a plurality of energy users and for a predetermined period and to store each energy user's meter reading, the plurality of schedules including at least one schedule associated with at least one energy user and at least one other schedule associated with at least one other energy user; and
   a processor in communication with the memory, the processor configured to calculate the difference between the schedule and the meter reading thereby forming a deviation between anticipated energy use and actual energy use for each energy user.

22. The system of claim 21 herein schedules relate energy usage to a predetermined period of time.

23. The system of claim 22 wherein each schedule sets forth the energy user's predicted consumption of energy from a predetermined energy provider.

24. The system of claim 23 wherein a plurality of schedules correspond to the predicted energy usage of the energy user, at least one of the schedules setting forth the energy user's predicted consumption of energy from a first predetermined energy provider and at least one of the schedules setting forth the energy user's predicted consumption of energy from a second predetermined energy provider.

25. The system of claim 21 wherein the meter readings from at least some of the energy users include an actual usage profile generated by the energy user's meter.

26. The system of claim 21 the energy is electricity.

27. A method for scheduling the generation of energy in an energy distribution network having a plurality of energy users receiving energy from at least one of a plurality of energy sources, the method comprising the steps of:
 storing a schedule for each energy user, each schedule setting forth the predicted energy usage for that energy user over a predetermined period of time;
 summing the schedules of a predetermined set of energy users thereby creating a net schedule; and
 wherein a plurality of schedules correspond to the predicted energy usage of at least one energy user, at least one of the schedules setting forth the at least one energy user's predicted consumption of energy from a first predetermined energy provider and at least one of the schedules setting forth the least one energy user's predicted consumption of energy from a second predetermined energy provider.

28. The method of claim 27 comprising the additional step of communicating the net schedule to the energy provider.

29. The method of claim 27 comprising the additional step of recalculating the net schedule for each energy provider after a predetermined interval.

30. The method of claim 29 wherein the interval between recalculations is less than about one hour.

31. The method of claim 27 wherein the net schedules are net adjusted schedules, method comprising the additional steps of:
 storing temperature coefficients, each temperature coefficient corresponding to a particular energy user;
 retrieving the temperature coefficient for a particular energy user;
 multiplying the schedules by the temperature coefficients, thereby creating adjusted schedules; and
 wherein the step of summing the schedules of a predetermined set of energy users thereby creating a net schedule includes the step of summing the adjusted schedules of a predetermined set of energy users thereby creating the net adjusted schedules.

32. A method for allocating the deviation between the predicted energy usage for a plurality of energy users and the actual energy usage for the plurality of energy users, the method comprising the steps of:
 receiving meter readings of actual energy consumption for a plurality of energy users;
 storing a plurality of schedules of anticipated energy usage for a plurality of energy users and for a predetermined period, the plurality of schedules including at least one schedule associated with at least one energy user and at least one other schedule associated with at least one other energy user;
 storing each energy user's meter readings; and
 calculating the difference between the schedule and the meter readings thereby forming a deviation between anticipated energy use and actual energy use for each energy user.

33. A method of controlling the output of an energy provider, the method comprising the steps of:
 receiving a net schedule; and
 adjusting the output of the energy provider so that the output is substantially equal to the energy usage specified in the schedule.

34. The method of claim 33 wherein the energy provider is an electrical generator and the step of adjusting the output of the energy provider includes the step of increasing the electrical output of the generator.

35. The method of claim 33 wherein the energy provider is an electrical generator and the step of adjusting the output of the energy provider includes the step of decreasing the electrical output of the generator.

36. The method of claim 33 wherein the net schedule is a net adjusted schedule.

37. The system of claim 21 wherein the memory is further configured to store temperature coefficients and the processor is further configured to adjust the schedule as a function of the temperature coefficient before calculating the difference between the schedule and the meter reading.

38. A system for allocating the deviation between an energy user's predicted energy usage and the energy user's actual energy usage, the system comprising:
 means for receiving a meter reading of actual energy consumption for a plurality of energy users;
 memory in communication with the means for receiving a meter reading, the memory being configured to store a schedule of anticipated energy usage for each energy user and for a predetermined period and to store each energy user's meter reading; and
 a processor in communication with the memory, the processor configured to create a reconciled schedule representative of actual energy usage, the total energy represented in the reconciled schedule being substantially equivalent to actual energy used by the energy user, the processor being further configured to calculate the difference between the schedule and the reconciled schedule thereby forming a deviation between anticipated energy use and actual energy use for each energy user.

39. The system of claim 37 wherein schedules and reconciled schedules relate energy usage to a predetermined period of time.

40. The system of claim 37 wherein each reconciled schedule is further equivalent to total monthly consumption of the energy user.

41. The system of claim 21 wherein the memory is further configured to store temperature coefficients and the processor is further configured to adjust the schedule as a function of the temperature coefficient before calculating the difference between the schedule and the reconciled schedule.

* * * * *